United States Patent
Christen et al.

(10) Patent No.: US 8,308,607 B2
(45) Date of Patent: Nov. 13, 2012

(54) METHOD FOR AUTOMATICALLY RESTARTING AN INTERNAL COMBUSTION ENGINE IN A MOTOR VEHICLE

(75) Inventors: Urs Christen, Aachen (DE); Rainer Busch, Aachen (DE); Daniel B. Kok, Billericay (GB); Anthemios P. Petridis, Epping (GB); David Hesketh, Ingatestone (GB); Christopher E. Pedlar, Chelmsford (GB); Peter G. Wilson, Saffron Walden (GB)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 13/014,755

(22) Filed: Jan. 27, 2011

(65) Prior Publication Data

US 2012/0196723 A1  Aug. 2, 2012

(51) Int. Cl.
*F16D 48/06* (2006.01)
(52) U.S. Cl. ......................................................... 477/73
(58) Field of Classification Search .................. 477/107, 477/111, 200, 203, 181, 73, 172, 173; 180/65.21; 903/902
See application file for complete search history.

(56) References Cited

U.S. PATENT DOCUMENTS

| | | | |
|---|---|---|---|
| 6,371,889 B1 * | 4/2002 | Kuroda et al. | 477/181 |
| 7,354,379 B2 * | 4/2008 | Moriya | 477/199 |
| 7,762,926 B2 * | 7/2010 | Peterson | 477/172 |
| 8,157,705 B2 * | 4/2012 | Yu et al. | 477/200 |
| 2007/0060443 A1 * | 3/2007 | Kageyama et al. | 477/64 |

FOREIGN PATENT DOCUMENTS

DE   102004024213 A1   12/2005

* cited by examiner

*Primary Examiner* — Justin Holmes
*Assistant Examiner* — David J Hlavka
(74) *Attorney, Agent, or Firm* — David B. Kelley; MacMillan, Sobanski & Todd, LLC

(57) ABSTRACT

A method for automatic restarting a temporarily shut-down internal combustion engine with automatic stop-start in a motor vehicle with manual gear shift on the basis of conditions including the current actuation states of clutch and brake includes determining a current actuation state of a clutch and a wheel brake, and, if the brake has been actuated within a preset period before any actuation of the clutch, starting the engine when the clutch is fully actuated and the brake is released.

9 Claims, 3 Drawing Sheets

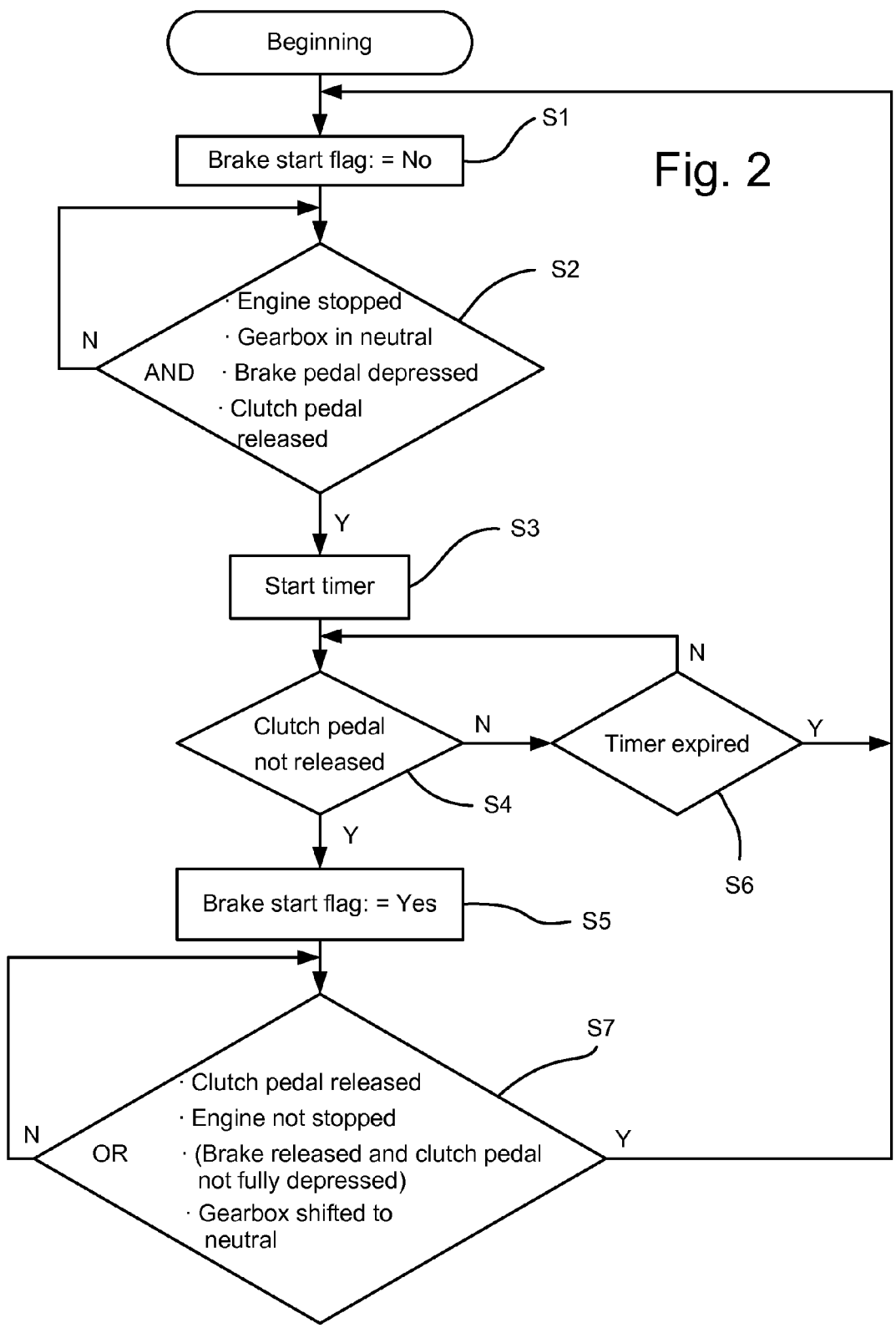

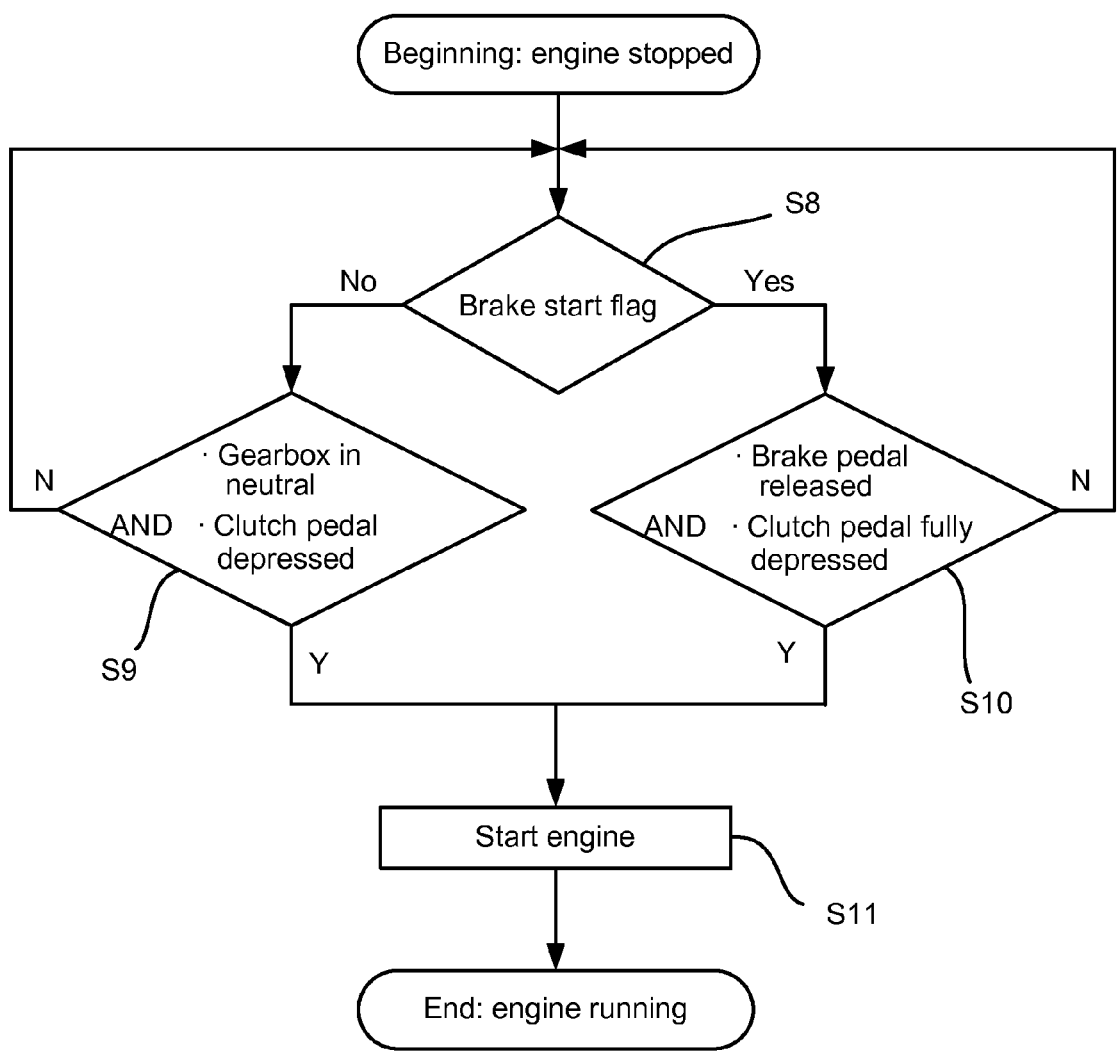

METHOD FOR AUTOMATICALLY RESTARTING AN INTERNAL COMBUSTION ENGINE IN A MOTOR VEHICLE

BACKGROUND OF THE INVENTION

1. Field of the Invention

The invention relates to a method for automatically restarting of a temporarily shut-down internal combustion engine in a motor vehicle having a manual gear shift on the basis of conditions including the current actuation states of clutch and brake, and to a corresponding stop-start control device, according to the preambles of the independent claims.

2. Description of the Prior Art

In "micro-hybrid" motor vehicles, i.e. hybrid electric motor vehicles with stop-start functionality, the internal combustion engine may optionally be stopped automatically, i.e. shut down, if no motive power is needed, e.g. when waiting at traffic lights, and automatically restarted, i.e. started up when the driver needs motive power again. Such a stop-start operation results in a reduction in fuel consumption and noise emissions. Systems which allow such a stop-start operation are for example belt-driven integrated starter generators (B-ISG) or improved starter motors, with which the engine may continually be automatically restarted.

A method and a stop-start control device is known from DE 10 2004 024 213 A1. In this case, the stopped internal combustion engine is started again when the driver actuates the clutch and at the same time does not operate the service brake (hereinafter brake for short). However, this is not very convenient and ergonomic for the driver, since situations arise in which it would be desirable for him/her to be able to set off without having to keep the brake released while actuating the clutch.

FIG. 1 illustrates in a block diagram a more convenient and ergonomic method of performing a stop-start function in a motor vehicle with a manual gear shift. The left-hand side of FIG. 1 shows that the internal combustion engine is shut down when the vehicle is stationary or falls below a preset speed threshold, the gearbox is in neutral and the driver has released the clutch pedal. Additional stop conditions are possible. The right-hand side of FIG. 1 shows that the internal combustion engine is restarted when the driver depresses the clutch pedal while in neutral. The driver may then engage a gear and accelerate the vehicle.

However, the driver often depresses the clutch pedal much earlier than is necessary. For example, if the vehicle is in a line of vehicles at traffic lights, the driver depresses the clutch pedal and engages first gear when the light turns green, and not when the vehicles in front of him/her have started to move and it is his/her turn to set off. Such typical driver behavior is modeled in the European Drive Cycle: the test driver must engage gear five seconds before he/she sets the vehicle in motion. This typical behavior increases fuel consumption.

SUMMARY OF THE INVENTION

A method for automatic restarting a temporarily shut-down internal combustion engine with automatic stop-start in a motor vehicle with manual gear shift on the basis of conditions including the current actuation states of clutch and brake includes determining a current actuation state of a clutch and a wheel brake, and, if the brake has been actuated within a preset period before any actuation of the clutch, starting the engine when the clutch is fully actuated and the brake is released.

The invention provides convenient, fuel-saving restarting if the brake has been actuated within a preset period before any actuation of the clutch, the internal combustion engine is only started when the clutch is fully actuated and the brake is not actuated.

The invention maximizes the stop time of the internal combustion engine, without this being disadvantageous for the driver with regard to starting the engine at the right time. If the driver depresses the brake pedal shortly before depressing the clutch pedal, e.g., less than two seconds before, the driver obviously does not intend to set the vehicle in motion immediately. In this case, the invention delays restarting the internal combustion engine until the driver releases the brake pedal.

The fuel saving achievable with the invention is considerable. In the situation modeled in the European Drive Cycle, each stationary phase of the vehicle is twenty seconds long, but after fifteen seconds the clutch pedal must be depressed and first gear engaged. By extending the stationary phase of the internal combustion engine to the full twenty seconds the fuel saving is increased by up to thirty-three percent.

The invention is particularly suitable for hybrid electric motor vehicles, in which the fuel saving is maximized by the invention.

DESCRIPTION OF THE DRAWINGS

The invention is explained in greater detail below by way of example with reference to the drawings, in which:

FIG. 2 is a block diagram which shows an example of how it can be determined whether or not the brake has been actuated within a preset time period before any actuation of the clutch; and FIG. 3 is a block diagram of a stop-start function according to the invention in a motor vehicle with manual gear shift using the result of the determination procedure carried out in FIG. 2.

DESCRIPTION OF THE PREFERRED EMBODIMENT

Figure 1:
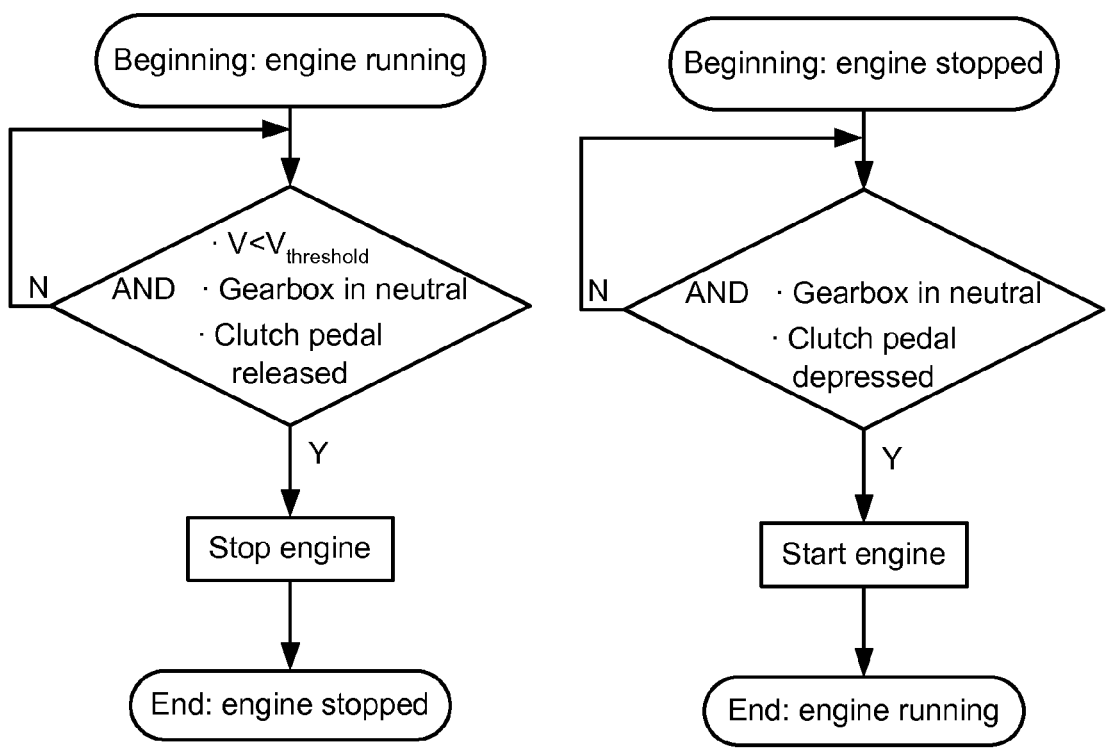
FIG. 1 is a block diagram of a conventional stop-start function in a motor vehicle with manual gear shift.

As shown in FIGS. 2 and 3, unnecessary triggering of starting is suppressed by the introduction of a "brake start flag". The brake start flag is for example a bit which, when the flag is set, is "Yes", "True" or "One" and, when the flag is not set, is "No", "False" or "Zero".

The routine shown in FIG. 2 is carried out continually when a vehicle with manual gear shift is traveling, the brake start flag initially being set to "No" in step S1.

In step S2, a test is performed to determine whether the following four conditions are met concurrently: the internal combustion engine is stopped, for example as the result of the stop routine shown on the left-hand side in FIG. 1; the gearbox is in neutral; the brake pedal is depressed or actuated; and the clutch pedal is released or not depressed. If these four conditions are not met concurrently, step S2 is carried out again. If the four stated conditions are met concurrently, a timer is started in step S3, i.e. a time counter, which counts a preset period of time and then expires.

In step S4 a test is performed to determine whether the clutch pedal is not released or is depressed. If the clutch pedal is not released, the brake start flag is set to "Yes" in step S5. If the result of the test of step S4 is that the clutch pedal is released, in step S6 a test is performed to determine whether the timer has expired. If the timer has not expired, step S4 is carried out again. If the check in step S6 shows that the timer has expired, the routine returns to step S1, in which the brake start flag is reset to "No".

If in step S5 the brake start flag has been set to "Yes", the routine proceeds to step S7, in which a test is performed to determine whether one of the following four conditions is met: The clutch pedal is released; the internal combustion engine is not stopped; the brake pedal is released and the clutch pedal is not fully depressed; the driver has put the gearbox in neutral. If one of these conditions is met, the process returns to step S1, in which the brake start flag is reset to "No". If the result of the test check in step S7 is that none of the stated conditions is met, step S7 is carried out again.

The preset period of time counted by the timer amounts is about to two seconds. If in this case, while the engine is stopped and the gearbox is in neutral, the clutch pedal is released for two seconds after the brake pedal has been depressed, the brake start flag is set to "Yes". The flag is reset or set to "No" if the brake pedal is released while the clutch pedal is not fully depressed, or if the clutch pedal is released after having initially been depressed, the gearbox is switched to neutral or the engine is no longer stopped. It will be noted that engaging a gear does not reset the flag. But shifting back to neutral does reset the flag.

With the brake start flag fixed in this way, the start routine shown in FIG. 3 is performed for example instead of the start routine shown on the right-hand side in FIG. 1.

The routine shown in FIG. 3 begins when the internal combustion engine has been stopped. In step S8 it is then checked whether the brake start flag has been set to "Yes" or "No". If the brake start flag has been set to "No", in step S9 a test is performed to determine whether the following two conditions are met concurrently: The gearbox is in neutral, and the clutch pedal is fully or at least partially depressed. If these two conditions are not met concurrently, step S8 is carried out again. If the two stated conditions are met concurrently, the internal combustion engine is started in step S11.

If the check in step S8 reveals that brake start flag has been set to "Yes", in step S10 a test is performed to determine whether the following two conditions are met concurrently: the brake pedal is released and the clutch pedal is fully depressed. If these two conditions are not met concurrently, step S8 is carried out again. If the two stated conditions are met concurrently, in step S11 the internal combustion engine is started, such that the driver is able to set the vehicle in motion.

In the routine shown in FIG. 3, an additional start trigger is provided in addition to the start trigger shown on the left in FIG. 1: if the brake start flag is set to "Yes", the clutch pedal is fully depressed and the brake pedal has been released, starting of the internal combustion engine is triggered. It will be noted that this may be an engine start with a gear engaged, which is why the clutch pedal must here be fully depressed.

If the brake start flag is reset but the gearbox is not in neutral, a message is displayed to the driver: if a gear has been engaged, the brake start flag is reset or set to "No" and the clutch pedal is not released, the message "select neutral" is displayed.

If engine stops with a gear engaged are to be allowed, the conditions may be suitably modified. Different start triggers may be provided for such a strategy. Such measures include (a) releasing the brake pedal while the clutch pedal is fully depressed, this being irrespective of whether the gearbox is in neutral or whether a gear has been engaged, and (b) full depression of the clutch pedal, likewise irrespective of whether the gearbox is in neutral or a gear has been engaged. The start trigger (b) may be suppressed if the brake pedal is depressed shortly before the clutch pedal is depressed. The internal combustion engine is then started on release of the brake pedal, namely by means of the trigger (a).

It will be noted that for both strategies, i.e. engine stops in neutral and with a gear engaged, the start trigger based on clutch pedal actuation is not suppressed if the brake pedal remains depressed during the entire stationary phase of the vehicle. Only intentional depression of the brake pedal shortly before the clutch pedal is depressed suppresses starting of the internal combustion engine.

The invention is not only advantageous in the situation described further above, where the vehicle is standing in a line of vehicles at traffic lights, but rather for example also in situations in which the vehicle has stopped on a slope. So that the internal combustion engine is shut down automatically, the gearbox must be in neutral and the clutch pedal released. If the driver wants to set the vehicle in motion, the hand brake must be actuated to prevent the vehicle from rolling backwards, and the gear stick is actuated substantially simultaneously. The separation according to the invention of clutch pedal actuation and engine restarting makes it possible, without impairing fuel economy, to engage a gear and to start the internal combustion engine later and actuate the hand brake.

Accelerating the vehicle in a situation in which the vehicle has stopped on a slope becomes even more convenient if the internal combustion engine is started just by partially releasing the brake pedal. This may advantageously be achieved in that restarting of the internal combustion engine proceeds on actuation of a (hydraulic) brake, if the gradient of the braking pressure falls below a first threshold value and the braking pressure falls below a second threshold value, which is obtained by forming a mean of the braking pressure in the current shut-down phase.

In the case of a conventional motor vehicle, actuation of the clutch or the brake is understood to mean that the corresponding pedal has been depressed. However, the invention is of course also applicable to two-wheeled vehicles or other vehicles which comprise clutch and/or brake actuating elements other than pedals.

A description follows of a number of specific traffic situations in which the described method applies. In all cases the control strategy consists in not triggering restarting of the engine if the brake pedal is actuated within a period of two seconds before actuation of the clutch pedal. Preconditions common to all these cases are that the internal combustion engine is stopped in neutral, that all pedals are released and that no special circumstances are detected which make it essential that starting be automatically prevented.

Main event sequence:
1. Driver depresses brake pedal
2. Driver waits five seconds
3. Driver depresses clutch pedal
4. Internal combustion engine is started First alternative event sequence (suppressed start in neutral; subsequent start by release of brake):
1. Driver depresses brake pedal
2. Driver waits 1.5 seconds
3. Driver depresses clutch pedal fully or right down
4. The internal combustion engine remains stopped
5. Driver waits five seconds (and possibly engages a gear)
6. Driver depresses brake pedal
7. Internal combustion engine is started Second alternative event sequence (no start, since clutch pedal not fully depressed):
1. Driver depresses brake pedal
2. Driver waits 1.5 seconds
3. Driver depresses clutch pedal, but does not press it down fully
4. The internal combustion engine remains stopped
5. Driver engages a gear
6. Driver depresses brake pedal 7. The internal combustion engine remains stopped; "Select neutral" is displayed
8. Driver changes into neutral
9. Internal combustion engine is started In the second alternative event sequence the internal combustion engine is not started if the driver has engaged a gear but is not depressing the clutch pedal fully, since the drive train is not open and starting of the internal combustion engine would thus not be safe.

Third alternative event sequence (fallback to start in neutral):
1. Driver depresses brake pedal
2. Driver waits 1.5 seconds
3. Driver depresses clutch pedal
4. The internal combustion engine remains stopped
5. Driver releases clutch pedal
6. Driver depresses brake pedal
7. Driver depresses clutch pedal
8. Internal combustion engine is started

The invention claimed is:

1. A method for automatically restarting a temporarily shut-down internal combustion engine in a motor vehicle having a manual gear shift, comprising:
   determining a current actuation state of a clutch and a wheel brake; and
   if the brake has been actuated within a preset period before any actuation of the clutch, starting the engine when the clutch is fully actuated and the brake is released.

2. The method of claim 1, further comprising:
   if the brake has not been actuated within a preset period before any actuation of the clutch, starting the engine when a gearbox is in neutral and the clutch is at least partially actuated.

3. The method of claim 1, further comprising:
   if the brake is actuated within the preset period of time before the clutch is actuated, starting the engine when the brake is no longer actuated.

4. The method of claim 1, further comprising:
   restarting of the internal combustion engine on the basis of brake actuation, if a braking pressure falls below a first reference and the braking pressure falls below a second reference, obtained from a mean of the braking pressure during a current engine shut-down phase.

5. The method of claim 1, further comprising:
   using a flag to indicate whether the brake has been actuated within the preset period before any actuation of the clutch.

6. The method of claim 5, wherein:
   if the flag is set to "No", performing a test to determine whether the engine is stopped, the gearbox is in neutral, the brake is not being actuated and the clutch is not actuated; and
   if the result of said test is logically true, starting a timer, which counts the preset period of time, and setting the flag to "Yes" if the clutch is actuated before the timer expires.

7. The method of claim 6, wherein:
   resetting to "No" the flag set to "Yes" during the run time of the timer, if either the clutch is not actuated or the engine is not stopped or the brake is not actuated when the clutch is not fully actuated, or the gearbox is shifted to neutral.

8. The method of claim 1, wherein the method is performed in a hybrid electric motor vehicle.

9. The method of claim 1, wherein a length of the preset period is about two seconds.

* * * * *